United States Patent [19]

Piers

[11] Patent Number: 4,800,752

[45] Date of Patent: Jan. 31, 1989

[54] FLOW RESTRICTING LOGGING TOOL AND METHOD

[75] Inventor: George E. Piers, Houston, Tex.

[73] Assignee: Schlumberger Technology Corporation, Houston, Tex.

[21] Appl. No.: 68,983

[22] Filed: Jul. 1, 1987

[51] Int. Cl.[4] ............................................. E21B 47/00
[52] U.S. Cl. ..................................... 73/155; 166/106; 166/241
[58] Field of Search ................ 73/155, 861.79, 861.89; 166/241, 213, 133, 188, 106

[56] References Cited

U.S. PATENT DOCUMENTS

| | | | |
|---|---|---|---|
| 2,701,615 | 2/1955 | Riordan, Jr. et al. | 166/188 X |
| 3,036,460 | 5/1962 | White et al. | 73/155 |
| 3,113,455 | 12/1963 | Sloan et al. | 73/155 |
| 3,114,422 | 12/1963 | Solum et al. | 166/241 X |
| 3,116,449 | 12/1963 | Vogel | 73/155 X |
| 3,163,038 | 12/1964 | Bryant | 73/155 |
| 3,357,025 | 12/1967 | Carlton et al. | 73/155 X |
| 4,424,860 | 1/1984 | McGill | 166/188 X |
| 4,441,362 | 4/1984 | Carlson | 73/155 |
| 4,452,076 | 6/1984 | Gavignet et al. | 73/155 |
| 4,625,798 | 12/1986 | Bayh, III | 166/106 |

FOREIGN PATENT DOCUMENTS

| | | | |
|---|---|---|---|
| 0262730 | 9/1963 | Australia | 73/155 |
| 0713997 | 2/1980 | U.S.S.R. | 73/155 |
| 0781331 | 11/1980 | U.S.S.R. | 73/155 |
| 0810950 | 4/1981 | U.S.S.R. | 73/155 |

OTHER PUBLICATIONS

Piers et al., "A New Flowmeter for Production Logging and Well Testing", Society of Petroleum Engineers, pp. 703–709, Sep. 1987.

Primary Examiner—Eugene R. Laroche
Assistant Examiner—Seung Ham
Attorney, Agent, or Firm—Henry N. Garrana; John H. Bouchard

[57] ABSTRACT

A well-logging tool, for use within a well borehole for measuring a characteristic of a flowing fluid therein, is shown to include a housing and a spinner for measuring the flow rate of the fluid. The spinner is disposed within the housing. To divert the fluid into the housing, the housing carries a funnel having a wide end and a narrow end, for sealing the annulus between the well borehole and the housing and for directing the flowing fluid into the housing. The narrow end of the funnel abuts and is attached to the housing. A pump is employed for pumping fluids into an inflatable tubular ring attached to the wide end of the funnel to seal the edges of the funnel against the borehole wall.

20 Claims, 3 Drawing Sheets

FLOW RESTRICTING LOGGING TOOL AND METHOD

The present invention relates to flow restrictive logging tools and methods for use within a borehole. The tool, according to the invention, includes a fluid directing means which can be deployed to close off the annulus between the outside diameter of the tool and the borehole whereby fluid is directed through the tool where characteristics of fluid flow at widely varying flow rates may be measured

BACKGROUND OF THE INVENTION

Packer flowmeters are widely used well-logging tools for obtaining indications of the rate of fluid flow through a well bore, normally being the well casing. Packer flowmeters generally include a passageway having an inlet orifice to the interior of the tool and an outlet orifice to the exterior of the tool, and a spinner section which measures the rate of fluid flow through the passageway The packer portion of the packer flowmeter closes .off the annulus between the outside diameter of the tool and the well bore, or well casing. This packer portion may be an inflated cloth bag, a metal basket type device, or other suitable, similar devices.

Examples of such flow restrictive devices are disclosed in U.S. Pat. Nos.: 4,452,076, to Gavignet et al; 2,649,710 to Dale; 2,706,406 to Vincent et al; 3,066,739 to Saureman et al; 3,789,217 to Youmans; and 3,176,511 to Widmyer. The Dale and Gavignet et al patents disclose the use of a packer device comprising a plurality of spaced fingers having thin, flexible, metallic vanes mounted on the fingers. The vanes form a downwardly flared truncated funnel serving to direct liquid flow into the tool. The Vincent et al patent discloses the use of a packer basket supported by bow springs. The Widmyer patent discloses the use of a collapsible shell packer in connection with the flowmeter tool. The Saureman et al and Youmans patents disclose the use of an inflatable packer element.

The foregoing packer flowmeters operate satisfactorily when the well is flowing at some flow rate and the leakage past the packer is tolerable. However, when higher flow rates are encountered in the well bore, the greatly restricted flow area caused by the packer generates a large pressure drop across the packer and consequently leaks having changing or unknown characteristics develop past the packer rendering the measurements inaccurate. Further, the increased pressure drop, or increased pressure force, acts upwardly against the packer and can damage the packer Under some circumstances, the increased pressure forces can cause the entire packer flowmeter to move upwardly through the well bore, or well casing, which is highly undesirable and adds to the unreliability of the measurements In producing oil and gas wells, where there are numerous perforations in the well casing, the flow rate of the flowing fluid varies along the length of the well casing. It is very common in such wells to have a low flow rate in the lower part of the well, but as the well logging tool is moved upwardly towards the upper end of the perforated zone of the well casing, the flow rate increases due to the increasing number of perforations below the tool. The foregoing described flowmeter devices while giving satisfactory results may not be capable of being used to measure the increased flow rate which can occur at the upper end of the producing zone of the well casing without encountering the previously described problems resulting from higher flow rates Thus, it becomes necessary to use one type of packer flowmeter well logging tool in the lower end of the production zone of the well bore, which tool must be removed from the well bore and substituted with another type of device to measure the increased fluid flow at the upper end of the producing zone of the well bore. If the two tools are run together, allowances must be made to insure that the results obtained from one tool are not affected by the other tool.

One solution proposed in the Gavignet et al. patent disclosure is to provide bypass means for relieving the increased pressure drop which may occur at the upper end of the producing zone or well. This solution, while improving over the prior art techniques, is still subject to inaccuracies caused by the aforementioned leaks which affect the measured value even at low flow rate and whose effect is exacerbated at high flow rates.

SUMMARY OF THE INVENTION

In accordance with the present invention, the foregoing short comings of the above discussed techniques, have been addressed through the novel design of the present flow restricting logging apparatus and method. In one embodiment, the tool of the present invention includes: a housing; means for measuring a fluid characteristic of the flowing fluid, disposed within the housing; and fluid impervious packer means for sealing the well borehole and for directing the flowing fluid into the housing In accordance with a second embodiment of the present invention, the tool is additionally provided with selective bypass means for directing a portion of the flowing fluid away from the housing upon the flowing fluid exerting a predetermined pressure force upon the sealing means or upon command from the surface, whereby characteristics of a fluid flowing at various flow rates can be determined with accuracy.

In accordance with yet a third embodiment of the present invention, a tool is provided with two or more flow restrictive elements and associated fluid characteristic measuring means, each as described with respect to either the first or second embodiments of the invention. The restrictive elements and corresponding fluid characteristic measuring means can be spaced apart at known locations along the tool to determine fluid characteristics of fluid flowing between two restrictive elements in addition to that flowing past all of the restrictive elements. This can be especially useful, for example, in determining flow rate from particular producing formations in the well which can be located between the restrictive elements through appropriate positioning of the tool in the well.

A feature of the present invention resides in the fact that the restrictive element or sealing means comprises a downwardly directed funnel formed of a fluid impervious material. The lower edges of the funnel are disposed for deployment adjacent the interior surface of the well borehole, while the upper edges of the funnel are disposed in an abutting relationship with the housing. The funnel may be upwardly directed when the device is employed in a well where the fluid flow is downward, e.g., an injection well.

In accordance with further principles of the present invention, in a first embodiment, a flow restricting logging tool, for use within a well borehole having a flowing fluid therein, has a selective means for sealing the well borehole and directing the flowing fluid through the housing of the logging tool. The sealing means has the shape of a funnel and is formed of fluid impervious material to prevent leakage of the well fluid therethrough. The funnel is attached at its narrow end to the logging tool while the wide end is attached to an inflatable tubular ring. A positive displacement pump, servo controlled from the surface, is provided to pump either clean oil from a reservoir in the tool or well fluid into the inflatable tubular ring and thus expand the funnel to close off the annulus between the outside diameter of the tool and the well bore, or well casing. The pressure differential created across the funnel, at some flow rates, improves its sealing quality. The sealing means is enclosed within a metal basket which protects the sealing means during handling at the surface and descent into a well.

An additional feature of the present invention illustrated in a second embodiment of the present invention resides in that the selective bypass means may include a plurality of elongated plate members which are operatively connected for swiveling motion with respect to the housing and overlie a cylindrical portion of the flowmeter housing The plate members are dimensioned such that when in a first position they would abut one another and lay flush with the outside of the housing in a specially grooved cylindrical section of the housing. The plate members are connected to the housing by respective swivel or spring members which allow their movement away from the housing to a second position where respective ends of the plates are spaced apart. This movement allows the existence of passageways between the plate members through which fluid may flow. The narrow or upper end of the funnel is attached to the respective ends of the plate members, which are appropriately restrained against movement to the second position.

The present invention also includes a method for measuring a fluid characteristic of a fluid flowing at varying flow rates within a well bore. The method includes the steps of: moving a housing, having a means for measuring a fluid characteristic within the housing, through the well bore to a first location; sealing the well bore proximate the first location by pumping fluid into an annular ring and directing the flowing fluid into the housing by utilizing a fluid impervious funnel attached to the ring. In accordance with another embodiment of the present invention the method includes directing a portion of the flowing fluid away from the housing upon the flowing fluid exerting a predetermined pressure force upon the sealing means or upon command from the surface, whereby fluid characteristics of a fluid flowing at higher flow rates may be measured in one trip through the borehole.

The well logging tool, for use within a well borehole having a flowing fluid therein, and method for measuring fluid characteristics of a fluid flowing at varying flow rates within a well borehole of the present invention, when compared with previously proposed prior art packer flowmeters and methods have the advantage of: employing the pressure differential across the packer to often improve the sealing quality of the packer; minimizing damage to the packer from increased pressure forces in the well borehole; and may be used throughout the same well borehole to measure fluid characteristics of a fluid flowing at widely varying flow rates to thus greatly increase the working range of the well logging tool. Additional advantages relate to: the fact that the tool is provided with its own fluid reservoir for inflating the ring; the smallness of the quantity of fluid needed for the inflation operation and the consequent enhancement in the speed of operations; and the protection afforded the sealing means during descent into a well.

While the invention will be described in connection with the preferred embodiments, it will be understood that it is not intended to limit the invention to these embodiments but to cover all alternatives, modifications, and equivalents as may be included within the spirit and scope of the invention as defined by the appended claims

DETAILED DESCRIPTION OF THE INVENTION

Figure 1:
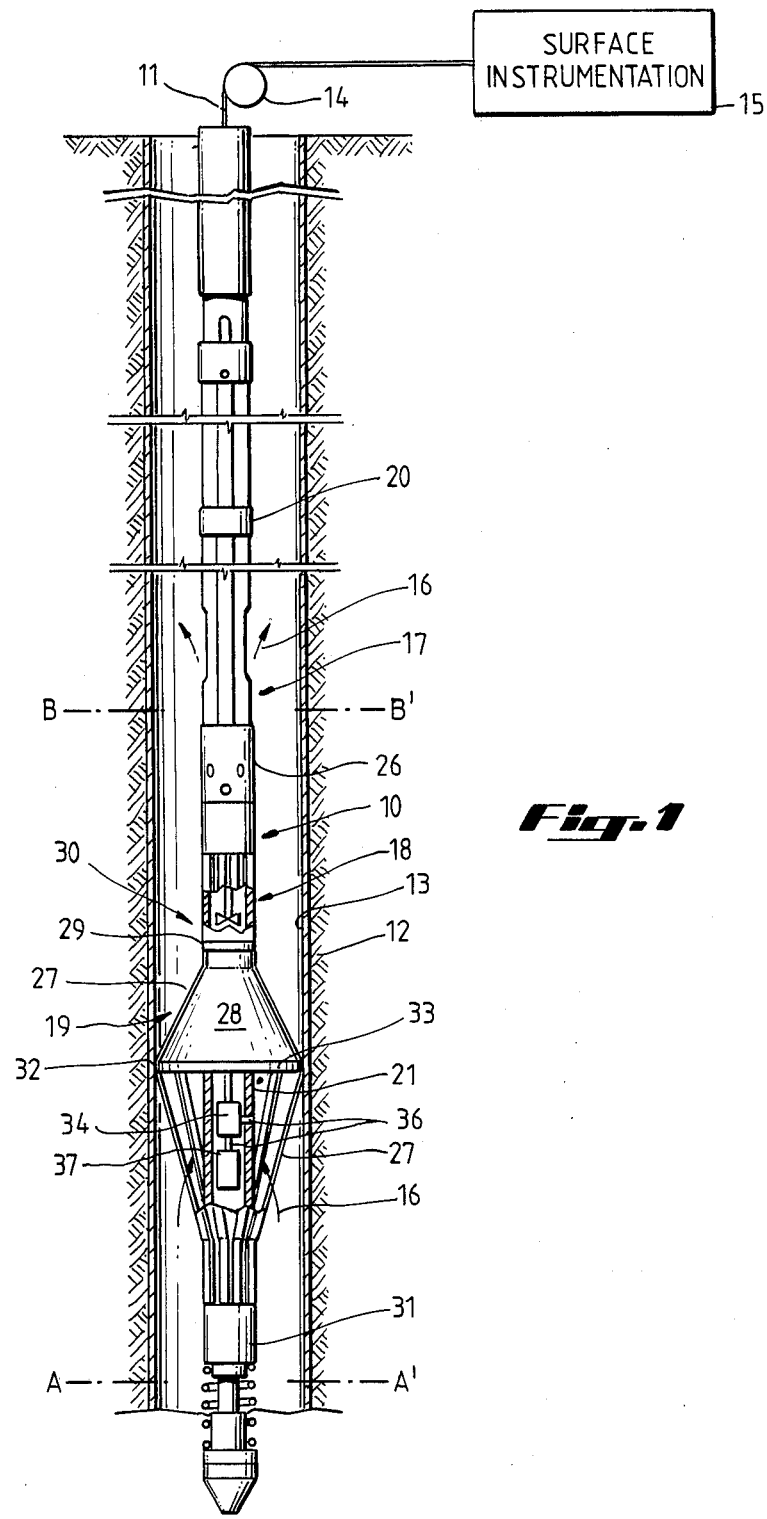
FIG. 1 is a partial cross-sectional view along the longitudinal axis of a well bore schematically illustrating the well logging tool in accordance with one embodiment of the present invention.

In FIG. 1, a well logging tool 10 in accordance with the present invention is shown suspended by means of a cable 11 within well bore 12. Well bore 12 has a conventional well casing 13 disposed on the interior surface thereof. A sheave wheel and winch illustrated at 14 and surface instrumentation generally illustrated at 15, are arranged, in a configuration well known in the logging art, to control the movement of the logging tool 10 in the borehole 12 (Reference may be had to U.S. Pat. No. 4,531,204 to David Vanderschel, the disclosure of which is incorporated herein by reference for the particulars of such a configuration). Flowing fluid, such as hydrocarbons, is shown by arrows 16, which flowing fluid passes through the well logging tool 10 as will be hereinafter described Well logging tool 10 generally comprises: a housing 17; measuring means 18 disposed in housing 17, such as an impeller, for measuring a fluid characteristic of the flowing fluid 16; and packer means 19 for sealing the well casing 13 and for directing the flowing fluid 16 into housing 17.

In the preferred embodiment, the measuring means 18 may comprise a flowmeter, of the form described in U.S. Pat. No. 4,452,076 to Gavignet et al which is incorporated herein by reference, whereby the fluid characteristic to be measured is the flow rate of the fluid 16. As is conventional in the art, well casing 13 has a plurality of perforations (not shown) disposed about its circumference and along its length, through which flowing fluid 16, such as hydrocarbons, pass from formations surrounding well bore 12 through the perforations into well casing 13.

Figure 2:
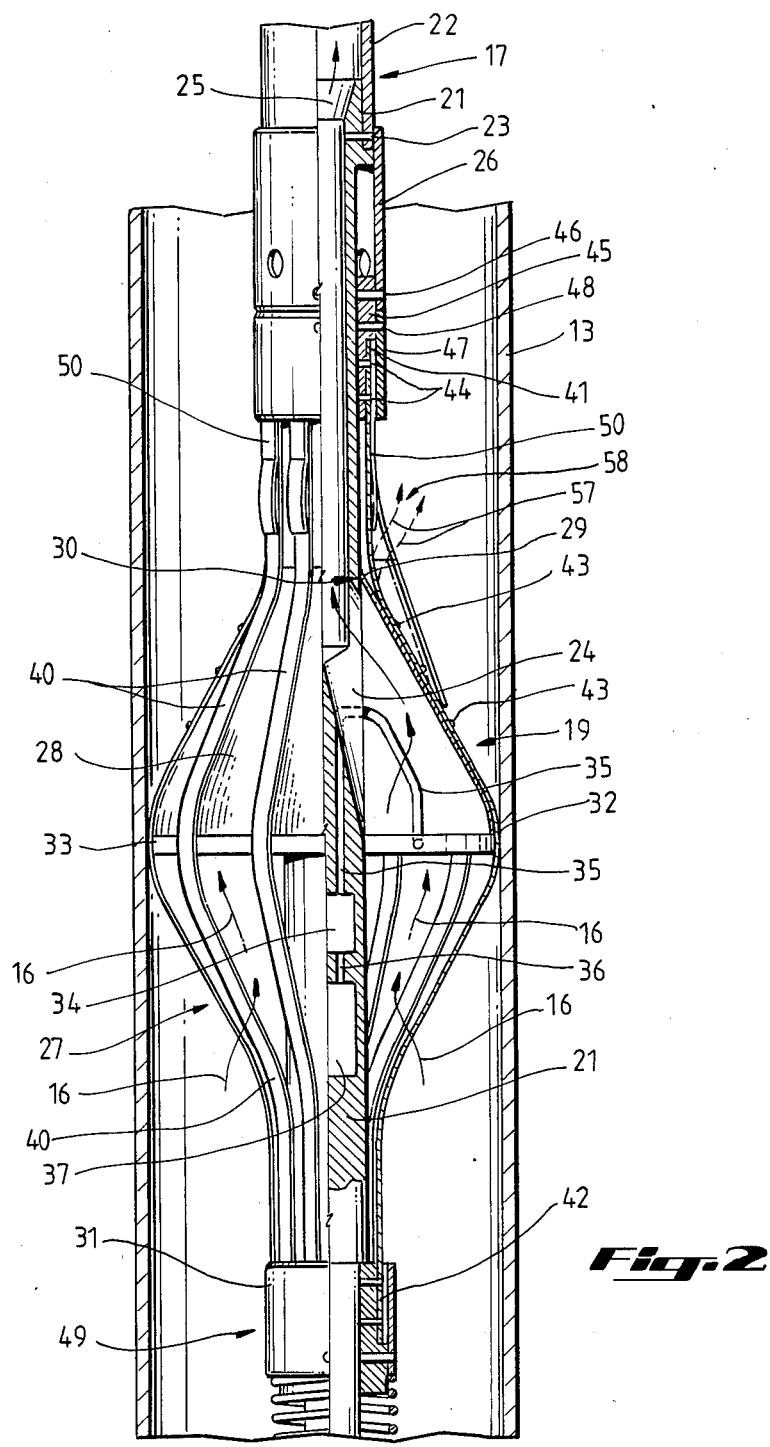
FIG. 2 is a partial cross-sectional view along the longitudinal axis of the well logging tool in accordance with another embodiment of the present invention.

Turning now to both FIG. 1 and FIG. 2, the structure of the well logging tool, or packer flowmeter, 10 in accordance with the present invention will be described in greater detail. With reference to FIG. 1, FIG. 2 generally corresponds to that portion of packer flowmeter 10 disposed between lines A—A' and B—B'. In general, housing 17 comprises a plurality of generally tubular shaped sections which are interconnected to one another as by any suitable connections, such as bolts and threaded connections. An actuator sleeve 20 is slideably mounted about the housing all as described in the aforementioned Gavignet et al. patent.

With particular reference now to FIG. 2, it is seen that housing 17 includes a mandrel 21 secured to the lower end of tubular housing member 22 as by bolts 23. Mandrel 21 has at least one passageway 24 in fluid transmitting relationship between the sealing and directing means 19 and the measuring means 18, which is disposed upstream of the upper end 25 of mandrel 21. As seen in FIG. 2, annular collar 26 of actuator sleeve 20 is in sliding engagement with mandrel 21 and tubular housing member 22 of housing 17, the operation of which elements will be hereinafter described in greater detail. The means 19 for sealing and for directing the flowing fluid 16 into housing 17 is shown to comprise a plurality of elongate spring members forming a packer basket 27. A downwardly flared funnel member 28 formed from a fluid impervious material serves to direct the flowing fluid 16 into passageway 24 of mandrel 21 and is disposed within the packer basket 27. The upper edges 29 of funnel 28 are normally disposed in a first position in an abutting relationship with the housing 17, or mandrel 21, as is shown at 30 in FIGS. 1 and 2.

The packer element 19, along with packer basket 27, which embodies one aspect of the present invention, is shown in an extended condition wherein it has an effective diameter substantially equal to the diameter of the casing 13. The packer element 19 is essentially comprised of an imperforate funnel shaped member 28 having a relatively low percentage of elongation per unit stress. The narrow end of the funnel member 28 may be pleated and gathered together and secured to the upper end 25 of mondel 21 at 30 while the wide end may be attached to the packer basket 27. The packer element 19 along with packer basket 27 may be retracted from its extended condition to a condition of comparatively small effective diameter by movement of bottom collar 31 relative to collar 26 and the effective folding of packer basket 27 through the action of actuator sleeve 20.

It will be appreciated from the foregoing description that the above described packer element is not subjected to forces sufficient to stretch or force assunder the material elements comprising the structure of the packer element when extended and hence is unlikely to be ruptured or torn in the borehole yet is capable of extension from a relatively small effective diameter, say 1-11/16" to a diameter of, for example, 8" without incurring any appreciable strain in the material. During handling at the surface and passage through the borehole the folded packer basket 27 protects the packer element 19.

The funnel member 28 itself may be composed of a treated fabric, for example, a fabric woven of Nylon fibers. For added sealability, the fabric may be impregnated with a silicone polymer such as polydimethylsiloxane sold under the trademark "RTV" by General Electric Corporation. In general, the funnel member 28 should have excellent chemical resistance, high electrical resistance and exceptional resistance to wetting by water. It should also be able to somewhat conform to the sidewalls of the borehole. Imperforate plastic film materials, such as the product polyethlene terephthalate resin sold under the trademark "Mylar" by E. I. du Pont de Nemours and Co. could be employed. Similarly, a woven fabric could be lined with an imperforate film material to form a suitable packer element; in any event, the selected material for the funnel member 28 should have a relatively low percentage of elongation per unit stress so that stretching strains are minimized when the funnel member 28 is in extended condition. In other words, the material should not stretch easily Also, the funnel member 28 should have good resistance to the chemical effects of borehole fluids.

The wide end 32 of the funnel member 28 has sealably attached to it an inflatable tubular ring 33 made of the same material as that used to make the funnel member 28 and impregnated with the aforementioned silicone polymer. A positive displacement pump 34 is disposed within the mandrel 21 and has a conduit 35 opening into the interior of the inflatable ring 33 and a conduit 36 opening either into a fluid reservoir 37 carried in the mandrel 21 or (through appropriate filter material which is not shown) into the borehole 12. The positive displacement pump 34 is driven by a motor (not shown), which is controlled from the surface electronics 15 via the cable 11. The positive displacement pump 34 is operated by the motor 7 to pump a predetermined amount of liquid from either the reservoir 37 or the borehole 12 through the conduit 36 and the conduit 35 into the inflatable ring 33 to cause the ring 33 to expand and assume its extended ring shape and therefore extend packer element 19 into its funnel form and seal the annulus existing between the mandrel 21 and the borehole 12 or casing 13. The inflatable ring 33 when deployed assures a high quality seal to the wall of borehole 12 or casing 13. By reversing the operation of the pump the ring 33 can be collapsed.

Packer basket 27 preferably comprises a plurality of elongate spring members 40, each having respective first and second ends 41 and 42, the first ends 41 being operatively associated with the housing 17. In accordance with a first embodiment of the invention, illustrated in FIG. 1, the funnel element 19 has its upper edges 29 secured directly to the mandrel 21 at 30. However, in accordance with a second embodiment of the present invention, illustrated in FIG. 2, the funnel member 28 has its upper edges 29 abutting mandrel 21 at 30 and secured to the elongate spring members 40 via a plurality of rivets 43, or any other suitable connectors. In either embodiment, the first ends 41 of elongate spring members 40 are operatively associated with housing 17 by means of a plurality of bolts 44, or any other suitable connectors, which secure the first ends 41 to a tubular ring member 45 which is slideably mounted around mandrel 21. Ring member 45 is in turn connected to annular collar 26 of actuator sleeve 20 by a plurality of bolts 46, or any other suitable connectors. Thus, upon longitudinal movement of actuator sleeve 20 with respect to housing 17, ring member 45 and the first ends 41 of elongate spring members 40 are likewise moved longitudinally. Ring member 45 may, if desired, be provided with an annular cover member 47 which overlies the first ends 41 of elongate spring members 40 and is secured to ring member 45 by a plurality of bolts 48, or any other suitable connector The second ends 42 of elongate spring members 40 are mounted to a bottom nose assembly, generally indicated at 49 for providing relative longitudinal movement of ends 41 and 42 between bottom nose assembly 49 and the collar 26. Reference may be had to the Gavignet et al patent for further details When it is desired to move the well logging tool 10, or packer flowmeter of the present invention to another location in the borehole 12 or well casing 13, the operation of the pump 34 is reversed and the inflatable ring 33 is deflated. Thereafter, the actuator sleeve 20 is moved upwardly with respect to housing 17 and its connection to ring member 45 will thus exert a force to pull upwardly o elongate spring members 40. That force and movement causes the cross-sectional diameter of the funnel member 28 to b contracted, whereby the packer flowmeter 10 may be readily moved through borehole 12 or well casing 13 to a location whereat flow rate measurements, or other measurements of fluid characteristics, are desired to be taken. Upon the packer flowmeter 10 being lowered via well-logging cable 11 to the desired location whereat fluid flow rates are desired to be measured, actuator sleeve 20 is moved downwardly with respect to housing 17, the elongate spring members 40 are thus forced downwardly and outwardly and the cross-sectional diameter of the funnel member 28 expands until the lower edges or wide end 32 of the funnel 28 are disposed adjacent the interior surface of well casing 13 in an abutting relationship. That abutting relationship is further enhanced by the pumping of fluids into the inflatable ring 33 which deploys lower edges 32 of funnel member 28 into a sealing relationship with the borehole wall or well casing 13.

In accordance with the second embodiment of the present invention, FIG. 2 shows a selective bypass means 58 including a plurality of elongate booster spring members 50, operatively associated with the housing 17. Booster springs 50 overlie the elongate spring members 40, and particularly the first ends 41 of elongate spring members 40. Preferably, booster springs 50 are secured to ring member 45 by the same bolts 44 which secure the first ends 41 of elongate spring members 40 to ring member 45. As shown in solid lines in FIG. 2, booster springs 50 are slightly curved and serve to bias the first ends 41 of elongate spring members 40 inwardly toward mandrel 21 to seal the upper edges 29 of the funnel element 19 against the mandrel 21 at 30.

Figure 3:
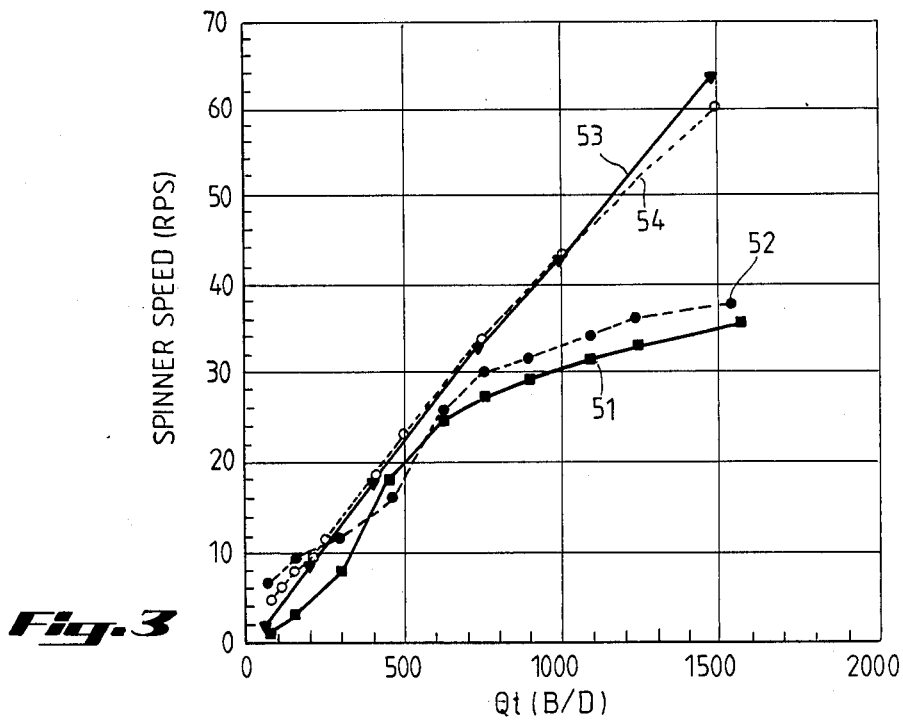
FIG. 3 is a chart illustrating the relationship between spinner speed compared with the flow rate of the flowing fluid of the well logging tool of the present invention and one of the prior art packer flowmeter tools.

With reference now to FIG. 3, the operation of the well logging tool, or packer flowmeter 10 will be described with reference to the first embodiment of the present invention illustrated in FIG. 1. In FIG. 3, the spinner speed in revolutions per second, or measured flow speed, through a packer passageway, is plotted with respect to the known flow rate in barrels per day of the flowing fluid 16. It should be noted that the numbers used on the horizontal and vertical axes of the chart of FIG. 3 are for illustrative purposes only. Curves 51 (solid line) and 52 (dotted line) are illustrative of prior art devices and show that as the flow rate of the flowing fluid 16 increases, the measured flow also increases but not at the same rate. With increasing flow, the slope of curves 51 and 52 tends to .flatten impairing the resolution and accuracy of the measurement. With prior art packer flowmeters and increased pressure forces acting upon the packer, the previously described problems can occur.

In contrast, it will be observed that curves 53 (solid line) and 54 (dotted line) illustrative of the present invention, show a good linearity between the measured flow and the actual flow with little loss of resolution at the higher flow rates. These results were consistent for a number of fluid mixtures of which the solid lines represent water and the dotted line represents kerosene with a ten percent water cut.

Figure 4:
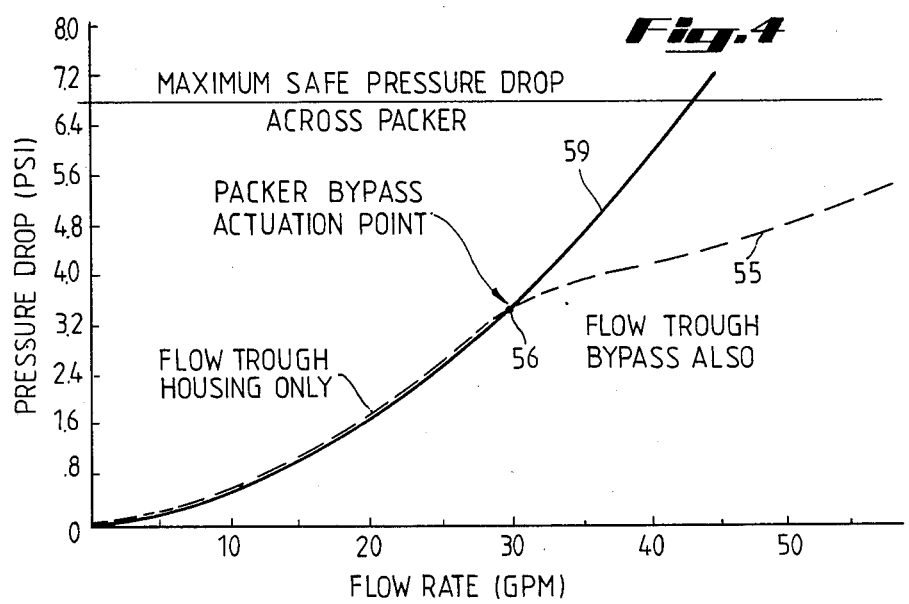
FIG. 4 is a chart illustrating the relationship between pressure drop across flowmeter packers compared with the flow rate of the flowing fluid.

With reference now to FIGS. 2 and 4, the operation of the well logging tool, or packer flowmeter 10 of the second embodiment of the present invention will be described. In FIG. 2 the position of the upper edges 29 of funnel element 19 are in an abutting relationship at point 30 with the housing 17, or mandrel 21, as shown in solid lines. This first position corresponds to the use of the packer flowmeter 10 when the flow rate of the flowing fluid 16 and corresponding pressure drop across sealing and directing means 19, corresponds to that portion of the curve 55 in FIG. 4 disposed between a zero flow rate and actuation point 56. Actuation point 56, corresponds to a predetermined pressure force exerted by the flowing fluid 16 upon sealing and directing means 19. The actuation point 56 is selected in accordance with the size of packer flowmeter 10 and expected flow conditions in well casing 13. It should be noted that elongate spring members 40 and booster springs 50 each have a particular spring constant associated therewith, which serve to exert a force and bias the upper edges 29 of funnel 28 toward housing 17, or mandrel 21, as shown in FIG. 2. When the flow rate of the flowing fluid 16, and its resultant pressure force exerted upon sealing and directing means 19 exceeds the predetermined pressure force represented by actuation point 56 in FIG. 4, the resulting pressure force will exceed the spring biasing forces of elongate spring members 40 and booster springs 50. Then, at least one, and preferably all, of the upper edges 29 of the funnel 28 will assume a second position as shown in dotted line in FIG. 2, spaced from the housing 17, or mandrel 21. As shown by dotted arrows 57 in FIG. 2, a portion of the flowing fluid 16 will be directed away from housing 17, or mandrel 21, through the space 58 disposed between mandrel 21 and the upper edges 29 of funnel 28. As the flow rate through well casing 13 increases, including a corresponding increased pressure force exerted upon sealing means 19 (as illustrated by that portion of curve 55 to the right of actuation point 56), the size of annular space 58 will increase to allow a greater portion of flowing fluid 16 to be directed away from housing 17. Likewise, as the flow rate and pressure forces decrease the forces exerted by the elongate spring members 40 and booster springs 50, will cause the upper edges 29 of funnel 28 to move toward housing 17, or mandrel 21, to decrease the size of space 58. Other types of bypass means are also within the contemplation of the present invention; such as for example a bypass valve that can assume either an open or closed position to provide a step increment of flow therethrough.

Turning now to FIG. 4, the general operation of the second embodiment of the well logging tool 10 of the present invention will be described. The pressure drop, or pressure forces, across a packer 19 (or the means for sealing and directing the flowing fluid 16 into the housing 17) is plotted with respect to the flow rate of the flowing fluid 16. It should be noted that the numbers used on the horizontal and vertical axes of the chart of FIG. 4 are for illustrative purposes only. Curve 59 (solid line) is illustrative of prior art devices and shows that as the flow rate of the flowing fluid 16 increases, the pressure drop, or pressure force acting upon the packer also increases. With prior art packer flowmeters and increased pressure forces acting upon the packer, the previously described problems can occur.

Still with reference to FIG. 4, it is seen that an additional curve 55 (in dotted lines) is plotted which represents the pressure drop across the sealing means 19 of the well logging tool 10 of the present invention when the second embodiment of the invention is utilized. Actuation point 56 on curve 55 represents a predetermined pressure force corresponding to a particular flow rate, at which point 56 bypass means 58 is selectively actuated to direct a portion of the flowing fluid 16 away from housing 17. Selective bypass means 58 thus reduces the net rate of pressure increase across the sealing means 19, and extends the effective measurement range of packer flowmeter 10.

As will be hereinafter described, selective-bypass means 58 directs a greater portion of the flowing fluid 16 away from housing 17 as the flow rate of the flowing fluid 16 and the pressure forces on sealing means 19 increases. The selective bypass means 58 allows an increased amount of the flowing fluid 16 to be directed away from housing 17 at a known rate. Therefore, the pressure drop across sealing means 19 and the corresponding flow rate of the flowing fluid 16 through well logging tool, or packer flowmeter, 10 may be accurately correlated with the actual flow rate of the flowing fluid 16 in the well casing 13. In general, the extended operating range of well logging tool 10 is represented by that portion of curve 55 in FIG. 4 beginning to the right of the predetermined actuation point 56 and extending to the right, and corresponding to increased flow rates. That portion of curve 55 thus represents the increase in measurable flow rate, or extended operating range, of well logging tool 10 without encountering an excessive pressure drop across the packer, or sealing means 19.

It is to be understood that the invention is not limited to the exact details of construction, operation, exact materials, or embodiment shown and described, as obvious modifications and equivalents will be apparent to one skilled in the art.

I claim:

1. A well-logging tool for use within a well borehole for measuring a characteristic of a fluid flowing therein, comprising:
    a housing having a bore therein;
    means for measuring a characteristic of said fluid, the means for measuring being disposed within said housing;
    sealing and directing means, comprising a funnel having a wide end and a narrow end, said narrow end abutting said housing for sealing the annulus between said well borehole and said housing and for directing said flowing fluid into said bore of said housing;
    an inflatable tubular ring attached to the periphery of the wide end of said funnel means; and
    a pump located within said housing for actuating said sealing and directing means by pumping a fluid into said inflatable tubular ring.

2. The well-logging tool of claim 1, further comprising selective bypass means for directing a portion of the flowing fluid, prevented by said sealing means from flowing through said annulus, to bypass said housing and enter said annulus upon said fluid exerting a predetermined pressure force upon said sealing and directing means.

3. The well logging tool of claim 2, wherein said sealing means comprises a plurality of flexible springs and wherein one end of each of said springs is attached to said narrow end of said funnel and are disposed in a first position in an abutting relationship with said housing when said pressure force is below said predetermined force, and at least one of said springs is disposed in a second position spaced from said housing when the pressure force exceeds said predetermined force.

4. The ell logging tool of claim 1, wherein said funnel is formed of as fluid impervious, flexible material.

5. The well logging tool of claim 4 further comprising a plurality of elongate spring members each having a first end mounted to a bottom nose assembly and a second end attached to said housing for relative longitudinal movement therebetween, and said wide end of said funnel being attached to said elongate spring members intermediate said first and second ends.

6. The well logging tool of claim 5, wherein the housing includes a mandrel secured thereto, said mandrel having at least one passageway in fluid transmitting relationship between said sealing and directing means and said means for measuring, the first ends of said elongate spring members being slideably mounted with respect to said mandrel, and a first portion of the bottom nose assembly is slideably mounted to the mandrel.

7. The well logging tool of claim 6 wherein a second portion of said bottom nose assembly is secured to said mandrel and said first portion of the bottom nose assembly is resiliently biased toward said funnel.

8. The well logging tool of claim 1, further comprising a fluid reservoir carried in said housing and connected to said pump for providing the fluid pressure needed for inflating said tubular ring.

9. The well logging tool of claim 4, further including a plurality of elongate spring members one end of each being attached to said flexible material, said material being disposed between said housing and said spring members.

10. The well-logging tool of claim 9, further including an actuator sleeve slideably mounted about said housing, said actuator sleeve being operatively associate with said first ends of said elongate spring members whereby upon movement of said actuator sleeve in a first direction, the spring members are moved adjacent the interior surface of the well casing, and upon movement of said actuator sleeve in a second direction, the spring members are moved away from the interior surface of said well casing to allow said well logging tool to be removed from said well casing 11. The well-logging tool of claim 10 wherein said actuator sleeve has at least one opening to allow fluid to flow out of the housing and into the well casing.

12. The well-logging tool of claim 1, wherein said means for measuring is a flowmeter.

13. A method for measuring characteristics of a fluid flowing at varying flowing rates within a well borehole, comprising;
    positioning a housing, having a means for measuring the fluid characteristics disposed within said housing, in a borehole at a first location;
    directing said fluid into said housing by utilizing a fluid-impervious, funnel-shaped material attached at one end thereof to said housing; and
    sealing the annulus between the well borehole wall and the housing proximate said first location by inflating an inflatable tubular ring which is attached to the periphery of the other end of said material.

14. The method of claim 13 further comprising the step of:

directing a portion of said fluid, prevented by said sealing and directing means from flowing through the annulus, to bypass said housing and enter said annulus upon said fluid exerting a predetermined pressure force across said directing means.

15. The method of claim 14 including the steps of:

flexibly attaching said other end of said material to a plurality of elongate spring members having first and second ends, and operatively associating said first ends with said housing; and mounting the second end of said elongate spring members to a bottom nose assembly for relative longitudinal movement therebetween.

16. The method of claim 15 further comprising the steps of:

slideably mounting an actuator sleeve about said housing;

operatively associating said actuator sleeve with the first ends of said elongate spring members;

moving the actuator sleeve in a first direction thereby moving said other end of said material adjacent the borehole wall; and moving said actuator sleeve in a second direction to move said other end of said material away from the borehole wall to allow said housing to be moved to a second location.

17. A well-logging tool for use within a well borehole for measuring a characteristic of a fluid flowing therein, comprising:

a housing having a bore therein;

means for measuring a characteristic of said fluid, the means for measuring being disposed within said housing;

sealing and directing means, comprising a funnel having a wide end and a narrow end, said narrow end abutting said housing, for sealing the annulus between said well borehole and said housing and for directing said flowing fluid into said bore of said housing and wherein said funnel, when open, encloses a given volume;

sealing means acting upon the periphery of said wide end of said funnel for sealingly engaging said periphery to said borehole;

means for actuating said sealing means by supplying fluid under pressure to said sealing means where the volume of fluid supplied is much smaller than said given volume.

18. The well-logging tool of claim 17 wherein said sealing means comprises an inflatable tube attached to said periphery of said funnel.

19. The well-logging tool of claim 18 wherein said means for measuring is a flowmeter.

20. The well-logging tool of claim 18, further comprising selective bypass means for directing a portion of the flowing fluid, prevented by said sealing means from flowing through said annulus, to bypass said housing and enter said annulus upon said fluid exerting a predetermined pressure force upon said sealing and directing means.

* * * * *